United States Patent
Ito et al.

(10) Patent No.: US 8,255,206 B2
(45) Date of Patent: Aug. 28, 2012

(54) VOICE MIXING METHOD AND MULTIPOINT CONFERENCE SERVER AND PROGRAM USING THE SAME METHOD

(75) Inventors: Hironori Ito, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 12/438,659

(22) PCT Filed: Aug. 28, 2007

(86) PCT No.: PCT/JP2007/067101
§ 371 (c)(1),
(2), (4) Date: Mar. 12, 2009

(87) PCT Pub. No.: WO2008/026754
PCT Pub. Date: Mar. 6, 2008

(65) Prior Publication Data
US 2009/0248402 A1    Oct. 1, 2009

(30) Foreign Application Priority Data
Aug. 30, 2006    (JP) ................................ 2006-232919

(51) Int. Cl.
*G10L 19/00* (2006.01)
*G10L 19/14* (2006.01)
*G10L 19/02* (2006.01)
*H04M 11/00* (2006.01)
*H04M 13/00* (2006.01)
*H04B 1/00* (2006.01)

(52) U.S. Cl. ..... 704/201; 704/211; 704/229; 379/88.07; 379/177; 381/119

(58) Field of Classification Search ........................ None
See application file for complete search history.

(56) References Cited

U.S. PATENT DOCUMENTS

| | | | | | |
|---|---|---|---|---|---|
| 4,456,789 | A | * | 6/1984 | Groves et al. | 379/202.01 |
| 5,150,410 | A | * | 9/1992 | Bertrand | 380/28 |
| 6,008,838 | A | * | 12/1999 | Iizawa | 348/14.09 |
| 6,125,343 | A | * | 9/2000 | Schuster | 704/201 |

(Continued)

FOREIGN PATENT DOCUMENTS

JP        1994085932 A    3/1994

(Continued)

OTHER PUBLICATIONS

International Search Report for PCT/JP2007/067101 mailed Nov. 27, 2007.

(Continued)

*Primary Examiner* — Brian Albertalli

(57) ABSTRACT

The voice mixing method includes a first step for selecting voice information from a plurality of voice information, a second step for adding up all the selected voice information, a third step for obtaining a voice signal totaling the voice signals other than one voice signal, of the selected voice signals, a fourth step for encoding the voice information obtained in the second step, a fifth step for encoding the voice signal obtained in the third step, and a sixth step for copying the encoded information obtained in the fourth step into the encoded information in the fifth step.

19 Claims, 3 Drawing Sheets

U.S. PATENT DOCUMENTS

| | | | |
|---|---|---|---|
| 6,683,858 B1* | 1/2004 | Chu et al. | 370/263 |
| 6,697,342 B1* | 2/2004 | Smyth et al. | 370/260 |
| 6,940,826 B1* | 9/2005 | Simard et al. | 370/260 |
| 6,985,571 B2* | 1/2006 | O'Malley et al. | 379/202.01 |
| 7,599,834 B2* | 10/2009 | Raad et al. | 704/219 |
| 2002/0181686 A1* | 12/2002 | Howard et al. | 379/202.01 |
| 2003/0223562 A1* | 12/2003 | Cui et al. | 379/202.01 |
| 2004/0190701 A1* | 9/2004 | Biage | 379/202.01 |
| 2005/0102137 A1 | 5/2005 | Zinser et al. | |
| 2008/0008323 A1* | 1/2008 | Hilpert et al. | 381/1 |
| 2010/0020954 A1* | 1/2010 | Gilg et al. | 379/202.01 |
| 2010/0061536 A1* | 3/2010 | Gilg | 379/202.01 |

FOREIGN PATENT DOCUMENTS

| | | |
|---|---|---|
| JP | 1994169349 A | 6/1994 |
| JP | 1994350724 A | 12/1994 |
| JP | 2005151044 A | 6/2005 |
| JP | 2005229259 A | 8/2005 |

OTHER PUBLICATIONS

Supplementary European Search Report for EP 07 80 6574 issued Aug. 19, 2010.

* cited by examiner

VOICE MIXING METHOD AND MULTIPOINT CONFERENCE SERVER AND PROGRAM USING THE SAME METHOD

INCORPORATION BY REFERENCE

This application is the National Phase of PCT/JP2007/067101, filed Aug. 28, 2007, which is based upon and claims the benefit of priority from Japanese patent application No. 2006-232919, filed on Aug. 30, 2006, the disclosure of which is incorporated herein in its entirety by reference.

TECHNICAL FIELD

The invention relates to a voice mixing method and a multipoint conference server and program using the same method. More specifically, it relates to a voice mixing method which mixes voices of all participants, subtracts the voice of one participant from the mixed voices, and transmits the subtracted voice to the same participant, and a multipoint conference server and a program using the same method.

BACKGROUND ART

In a multipoint conference service, voice data of each participant, which is encoded by a voice encoder, is transmitted to a multipoint conference server. The multipoint conference server transmits to every participant the voice data with the voices of the other participants than this one participant mixed.

When mixing the voice data, at first, voice signals of all the participants are calculated by adding all the decoded voice signals obtained by decoding the voice data of each participant. Next, the voice signals are obtained by subtracting own voice from the voice signals of all the participants, the voice signals are encoded and the generated voice data is transmitted to the respective participants.

As an example of a communication protocol between a terminal in a multipoint conference service and the server, ITU-T H.323 and H.324 are used in a circuit switching network, 3G-324M is used in a mobile network, and IETF RFC3550 RTP (Real-time Transport Protocol) is used in a packet network based on IP (Internet Protocol).

As the voice encoder, AMR (Adaptive Multi-Rate) method defined by G.711, G.729, and 3GPP TS26.090, AMR-WB (Wide Band) method defined by TS26.190, and an EVRC (Enhanced Variable Rate Codec) method defined by 3GPP2, that are the ITU-T standards, are used.

The G.711 method is to compress each sample of 16 bits in the voice signals sampled at 8 kHz to be 8 bits by using logarithmic transformation and in this method, calculation amount is small but compressibility ratio is low.

On the other hand, the G.729 method, the AMR method, and the EVRC method are based on a differential coding method according to the CELP (Code Excited Linear Prediction) principle and they can encode the voice signal more efficiently.

In the CELP, an encoder extracts a spectrum parameter showing a spectrum characteristic of the voice signal from the voice signal for every frame (for example, 20 ms) by using a linear prediction analysis (LPC: Linear Predictive Coding).

Further, the frame-divided voice signal is further divided into sub-frames (for example, 5 ms), parameters (a delay parameter and a gain parameter corresponding to a pitch period) in an adaptive code book are extracted based on a past sound source signal for every sub-frame, and the pitch of the voice signal of the corresponding sub-frame is predicted according to the adaptive code book. A most suitable sound source code vector is selected from a sound source code book (vector quantization code book) consisting of predetermined kinds of noise signals and a most suitable gain is calculated for a residual signal obtained through the pitch prediction, thereby quantizing the sound source signals.

The sound source code vector is selected in order to minimize an electric power error between a signal synthesized by the selected noise signal and the above mentioned residual signal. A combination of index, gain, spectrum parameter, and parameter in the adaptive code book, indicating the kind of the selected code vector is transmitted as the voice data.

A decoder calculates a sound source signal and a synthetic filter coefficient in the linear prediction analysis from a parameter obtained from the voice data and the sound source signal is driven through the synthetic filter, thereby obtaining the complex voice signal.

A voice mixing method is disclosed (refer to Patent Document 1) in which comparison/selection processing is not performed for every sample and a plurality of samples following the sample of the selected voice data are selected based on the result of one comparison/selection processing in size in the samples.

Further, a voice mixing method is disclosed (refer to Patent Document 2) in which a total signal is once generated in a mixing unit, its own voice information (voice information transmitted by one user) is subtracted from the total signal, and the voice information of other than the user is returned to itself.

A communication control unit is disclosed (refer to Patent Document 3) in which a voice synthesis unit adds each voice data converted into the linear data by each heterogeneous encoding/decoding unit, after that, voice data is generated by subtracting the own voice from the added voice data, and it is transmitted to the corresponding heterogeneous encoding/decoding unit.

Patent Document 1 Japanese Patent Publication Laid-Open No. 2005-151044 (paragraph 0014, 0016 and 0045)

Patent Document 2 Japanese Patent Publication Laid-Open No. 2005-229259 (paragraph 0003 and FIG. 1)

Patent Document 3 Japanese Patent Laid-Open No. 6-350724 (paragraph 0020 and FIG. 2)

In a multipoint conference system in the related art, the voice with the voices of all the participants other than the self participant mixed is encoded and transmitted to every participant. At that time, since the amount of calculation through voice encoding increases according to an increase in the number of participants, the system uses a method for detecting each speaker who is uttering and restricting the number of voices to be mixed, thereby reducing the number of voice encoders to be operated.

In the case of using a voice encoder performing a differential coding like the CELP method, since an inconsistency occurs in a memory showing the condition of the encoder when switching the encoder according to a change of the speaker, there is a problem that abnormal sound occurs in a decoded voice.

Means for solving the problem are not disclosed in the above Patent Documents 1 to 3.

SUMMARY

An exemplary object of the invention is to provide a voice mixing method which can prevent abnormal sound from occurring in the decoded voice when switching the encoder according to a change of a speaker, and a multipoint conference server and program using the above method.

According to a first exemplary aspect of the invention, a voice mixing method for mixing a plurality of voice information includes a first step for selecting voice information from a plurality of voice information, a second step for adding up all the selected voice information, a third step for obtaining a voice information totaling the voice information other than a voice information, of the selected voice information, a fourth step for encoding the voice information obtained in the second step, a fifth step for encoding the voice information obtained in the third step, and a sixth step for copying the encoded information obtained in the fourth step into the encoded information in the fifth step.

According to a second exemplary aspect of the invention, a multipoint conference server which mixes a plurality of voice information, includes a selector that selects voice information from the plurality of the voice information, an all signals adder that adds up all the voice information selected by the selector, an adder that obtains a voice signal by adding up the voice signals other than one voice signal, of the selected voice signals, a first encoder that encodes the voice information added by the all signals adder, a second encoder that encodes the voice information subtracted by the adder, and a switch that copies the encoded information obtained by the first encoder into the second encoder.

According to a third exemplary aspect of the invention, a program for performing voice mixing of a plurality of voice information, which makes a computer perform a first step for selecting voice information from a plurality of voice information, a second step for adding up the all selected voice information, a third step for subtracting the selected voice information from the added voice information one by one, a fourth step for encoding the voice information obtained in the second step, a fifth step 6 for encoding the voice information obtained in the third step, and a sixth step for copying the encoded information obtained in the fourth step into the encoded information obtained in the fifth step.

Other objects, features and advantages of the invention will become clear from the detailed description given herebelow.

EXEMPLARY EMBODIMENT

Hereinafter, exemplary embodiments of the invention will be described referring to the accompanying drawings.

First Exemplary Embodiment

Figure 1:
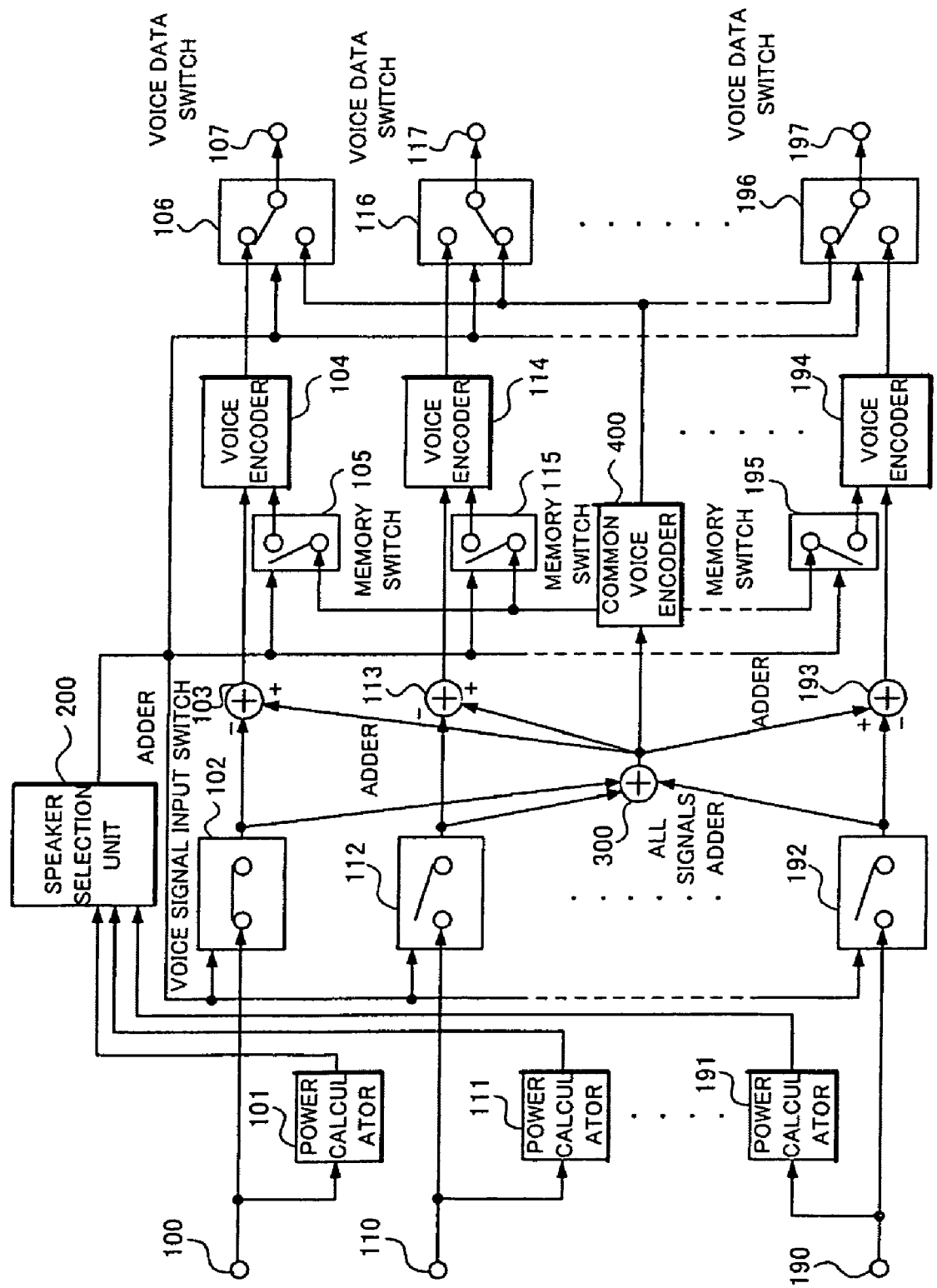
FIG. 1 is a structural view of a multipoint conference server according to the first exemplary embodiment of the invention.

FIG. 1 is a structural view of a multipoint conference server according to the first exemplary embodiment of the invention. The multipoint conference server according to the first exemplary embodiment of the invention comprises voice input terminals (or input voice signal) 100, 110, . . . , and 190, power calculators 101, 111, . . . , and 191, speaker selector 200, voice signal input switches 102, 112, . . . , and 192, all signals adder 300, adders 103, 113, . . . , and 193, voice encoders 104, 114, . . . , and 194, memory switches 105, 115, . . . , and 195, a common voice encoder 400, voice data switches 106, 116, . . . , and 196, and speaker destined voice output terminals (or speaker destined voice output) 107, 117, . . . , and 197.

The voice input terminals 100, 110, . . . , and 190 correspond to a speaker 1, a speaker 2, . . . , a speaker M. The power calculators 101, 111, . . . , and 191, the voice signal input switches 102, 112, . . . , and 192, the adders 103, 113, and 193, the voice encoders 104, 114, . . . , and 194, the memory switches 105, 115, . . . , and 195, the voice data switches 106, 116, . . . , and 196, and the speaker destined voice output terminals 107, 117, . . . , and 197 correspond to the respective speakers similarly.

Figure 2:
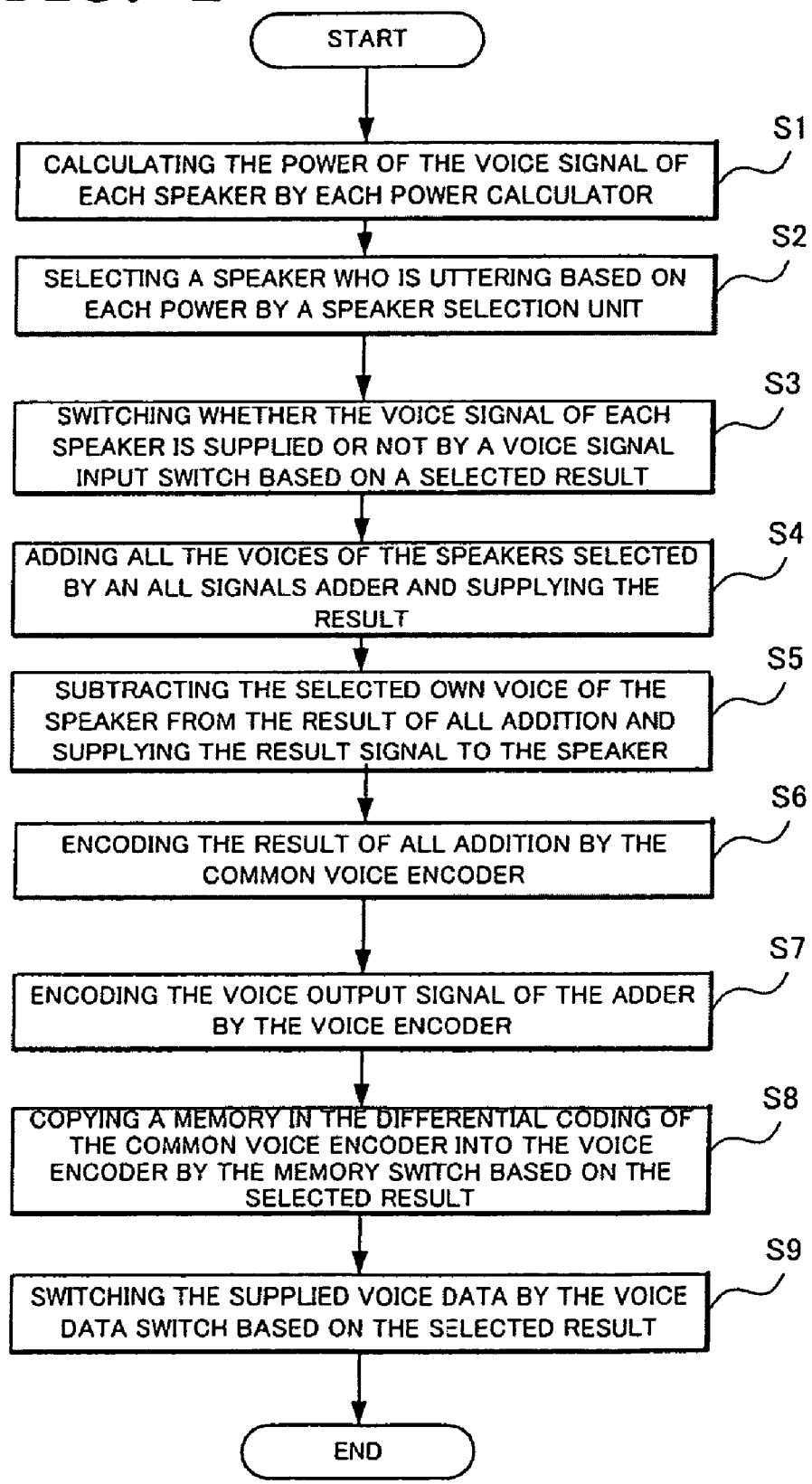
FIG. 2 is a flow chart showing an operational procedure of the multipoint conference server according to the first exemplary embodiment of the invention.

Next, an operation of the first exemplary embodiment will be described referring to FIG. 1 and FIG. 2. FIG. 2 is a flow chart showing the operational procedure of the multipoint conference server according to the first exemplary embodiment of the invention. Hereinafter, although only the processing blocks corresponding to the speaker 1, the speaker 2, and the speaker M are described, the same processing is performed on the speakers not illustrated.

The power calculator 101, the power calculator 111, and the power calculator 191 calculate the respective powers corresponding to the input voice signal 100, the input voice signal 110, and the input voice signal 190 of the speaker 1, the speaker 2, and the speaker M respectively and output the above powers (Step S1 of FIG. 2).

The speaker selector 200 selects a speaker who is speaking by using the calculated powers of respective speakers and outputs the selected result (Step S2 in FIG. 2).

The voice signal input switch 102, the voice signal input switch 112, and the voice signal input switch 192 switch whether or not to output the input voice signals of the respective speakers based on the selected result of the speaker selector 200 (Step S3 in FIG. 2).

The all signals adder 300 supplies the voice signal obtained by totaling all the voices corresponding to the speaker selected in the speaker selector 200 (Step S4 in FIG. 2).

The adder 103, the adder 113, and the adder 193 supply the voice signals obtained by subtracting the voice signal of the selected speaker from the voice signal supplied from the all signals adder 300 (Step S5 in FIG. 2).

Namely, they supply the voice information obtained by subtracting the voice information of the speakers who respectively correspond to the voice encoders 104, 114, and 194, of the selected speakers from the voice signal supplied from the all signals adder 300.

The common voice encoder 400 encodes the voice signal supplied from the all signals adder 300 (Step S6 in FIG. 2).

The voice encoder 104, the voice encoder 114, and the voice encoder 194 encode the voice signals supplied from the adder 103, the adder 113, and the adder 193 (Step S7 in FIG. 2).

The memory switch 105, the memory switch 115, and the memory switch 195 copy the contents of the memory in the differential coding in the common voice encoder 400 with the voice encoder 104, the voice encoder 114, and the voice encoder 194 respectively based on the selected result of the speaker selector 200 (Step S8 in FIG. 2).

Specifically, the memory switches respectively copy the encoded information that is the result of the differential coding stored in the memory of the common voice encoder 400, into the memories of the voice encoder 104, the voice encoder 114, and the voice encoder 194. Thus, the memories of the voice encoder 104, the voice encoder 114, and the voice encoder 194 become the same conditions as the memory of the common voice encoder 400.

Based on the selected result of the speaker selector 200, the voice data switch 106, the voice data switch 116, ..., and the voice data switch 196 switch the output voice data (Step S9 in FIG. 2).

Specifically, as an example, when the speaker 1 is selected and the speaker 2 and the speaker M are not selected, the voice input signal switch 102 of the speaker 1 is turned ON, the voice input signal switch 112 of the speaker 2 and the voice input signal switch 192 of the speaker M are turned OFF, the memory switch 105 of the speaker 1 is turned ON, the memory switch 115 of the speaker 2 and the memory switch 195 of the speaker M are turned OFF, the voice data switch 106 of the speaker 1 is connected to the side of the speaker 1, and the voice data switch 116 of the speaker 2 and the voice data switch 196 of the speaker M are connected to the side of the common voice encoder 400.

The all signals adder 300 totals the voice signals of the speaker 1 through the voice signal input switch 102 and the totaled signal is supplied to the common voice encoder 400.

The adder 103 subtracts the voice signal of the speaker 1 from the voice signal of the speaker 1 which is totaled by the all signals adder 300 and the result signal is supplied to the voice encoder 104. The output signal of the voice encoder 104 is transmitted to the speaker 1 through the voice data switch 106.

The voice signal supplied to the common voice encoder 400 is transmitted to the unselected speaker 2 and speaker M through the voice data switches 116 and 196.

The first exemplary embodiment of the invention is characterized in that the information stored in the common voice encoder 400 is copied into the voice encoder 104 through the memory switch 105 at a moment when the speaker 1 turns from the unselected state to the selected state or that the information stored in the common voice encoder 400 is copied into the voice encoder 114 through the memory switch 115 at a moment when the speaker 2 is changed to be selected.

According to this, when switching the voice encoder at a change of the speaker, it is possible to prevent the abnormal sound from occurring in the decoded voice, caused by the inconsistency in the memory showing the condition of the voice encoder.

In the first exemplary embodiment, though each of the adder 103, the adder 113, and the adder 193 is designed to supply the voice signal obtained by subtracting the voice signal of the selected speaker from the voice signal supplied from the all signals adder 300, the same result may be obtained in the structure of adding and outputting the voice signals other than that of the selected one speaker in the selected voice signals.

Operative Example

Hereinafter, a specific example of the exemplary embodiment will be described referring to FIG. 1. At first, the power calculator 101, the power calculator 112, and the power calculator 192 respectively calculate the powers of the voice signals of the input voice signal 100, the input voice signal 110, and the input voice signal 190, and supply and output the calculated powers to the speaker selector 200.

For example, the power P for the input voice signal s (n) of 8 kHz sampling is calculated by using the following formula (1) in every 20 mili seconds (160 sample).

$$P = \sum_{n=0}^{L-1} \sqrt{S^2(n)} / L \qquad \text{Formula (1)}$$

Here, as an example, L=160.

The speaker selector 200 selects a speaker who is uttering by using the input powers of the speakers and supplies whether it selects or not to the voice signal input switch 102, the voice signal input switch 112, the voice signal input switch 192, the memory switch 105, the memory switch 115, the memory switch 195, the voice data switch 106, the voice data switch 116, and the voice data switch 196.

As a method for selecting the uttering speaker, there are a method for selecting the speakers ranked-top N(N M and N and M are positive integers) predetermined in order of decreasing the power and a method for selecting the speaker having the power exceeding a predetermined threshold. Further, by use of the value smoothed through leak integration not by direct use of the input power may be considered.

When an input is defined as x (n) and an output is defined as y (n), the leak integration is represented as y (n)=k×y (n−1)+x (n). Here, 0≦k≦1 and k is a constant number.

The voice signal input switch 102, the voice signal input switch 112, and the voice signal input switch 192 respectively supply the input voice signal 100, the input voice signal 110, and the input voice signal 190 corresponding to the speakers selected by the speaker selector 200 to the corresponding adder 103, adder 113, and adder 193 and the all signals adder 300.

The all signals adder 300 supplies the voice signal obtained by totaling all the input voice signals to the adder 103, the adder 113, the adder 193, and the common voice encoder 400.

The adder 103, the adder 113, and the adder 193 supply the voice signal obtained by subtracting the respective voice signals supplied from the voice signal input switch 102, the voice signal input switch 112, and the voice signal input switch 192 from the voice signal supplied from the all signals adder 300, to the voice encoder 104, the voice encoder 114, and the voice encoder 194 respectively as for the speakers selected by the speaker selector 200.

In the voice after mixing, an adjustable Gain Gi indicated by the following formula (2) may be multiplied by the input voice signal of each speaker i in order to decrease a difference of sound volume among the speakers.

$$G_i = \frac{\sum_{k=1}^{1} P_k / N}{P_i} \qquad \text{Formula (2)}$$

A reference mark Pi is the power toward the speaker calculated by the formula (1) and N is the number of mixed signals. The Gi is calculated in reverse proportion to the power of the speakers, and when it is updated, for example, in every 20 mili seconds that is a calculation cycle of the power Pi, it changes too large, and therefore it may be smoothed as shown in the following formula (3).

$$G\_i = (1-\alpha) \times G\_i + \alpha \times G'\_i \qquad \text{Formula (3)}$$

Here, G'i shows the adjustable gain which has been calculated before. As a value of α, for example, 0.9 is used. In order to avoid excessive adjustment of the sound volume, for example, the possible range of the Gi may be limited to 0.5 to 2.

In order to adjust the sound volume of the mixed voice signal, the adjustable gain Ga shown by the following formula (4) may be multiplied by the mixed voice signal.

$$G\_a = P\_out | P\_a \quad \text{Formula (4)}$$

Here, Pa is the power of the mixed voice signal calculated by the formula (1) and Pout is the power of a target value at an adjustment time. The largest value of the speaker in the mixed voice signal of the speakers and the predetermined value of a predetermined level may be used. Smoothing may be performed and the possible range may be limited similarly to the above-mentioned Gi.

The common voice encoder 400 encodes the voice signal supplied from the all signals adder 300 and supplies the encoded voice data to the voice data switch 106, the voice data switch 116, and the voice data switch 196.

The voice encoder 104, the voice encoder 114, and the voice encoder 194 encode the voice signals and supply the encoded voice data to the voice data switch 106, the voice data switch 116, and the voice data switch 196 when the voice signals are supplied from the adder 103, the adder 113, and the adder 193.

The memory switch 105, the memory switch 115, and the memory switch 195 supply the contents of the memory in the differential encoding of the common voice encoder 400 respectively to the voice encoder 104, the voice encoder 114, and the voice encoder 194 when the speaker selector 200 turns to the speaker selection state from the not-selected state.

Owing to the processing of the memory switch, no inconsistency occurs in the memory in the differential coding at the time of switching the output of the output voice data from the common voice encoder 400 to the voice encoder 104, for example, with respect to the speaker 1.

On the other hand, at the time switching the output of the output voice data from the voice encoder 104 to the common voice encoder 400, since the memory of the common voice encoder 400 cannot be rewritten, an inconsistency occurs in the memories.

However, since this is at the time when the sound volume of the speaker 1 becomes small and the input voice of the voice encoder 104 becomes substantially equal to the input voice to the common voice encoder 400, deterioration in sound quality caused by the inconsistency in the both memories is small. In this case, in order to make the inconsistency in the memories small, after the same voice signal as the voice signal input to the common voice encoder 400 is supplied to the voice encoder 104 and it is operated for a while, the voice data switch 1 may be switched to the voice data supplied from the common voice encoder 400. An inconsistency in the memories becomes smaller according as it is operated with the same input voice signal for a longer time, however, there occurs a delay necessary for switching.

The voice data switch 106, the voice data switch 116, and the voice data switch 196 supply the voice data supplied from the voice encoder 104, the voice encoder 114, and the voice encoder 194 when it is selected as the speaker who is uttering, in the speaker selector 200, and they supply the voice data supplied from the common voice encoder 400 when it is not selected as the speaker who is uttering in the speaker selector 200.

In this exemplary embodiment, though it is assumed that all the voice encoders are the same, various kinds of voice encoders can be used or various kinds of bit rates can be mixed. In this case, the common encoders are needed for the number of various kinds of encoders or bit rates. The switching of the memories has to be performed on the same kind of encoders or bit rates.

As described above, according to the operative example of the invention, there is a merit that no inconsistency occurs in the memories in the differential coding at the time of switching the output of the output voice data from the common voice encoder 400 to the voice encoder 104, for example, with respect to the speaker 1.

Second Exemplary Embodiment

Figure 3:
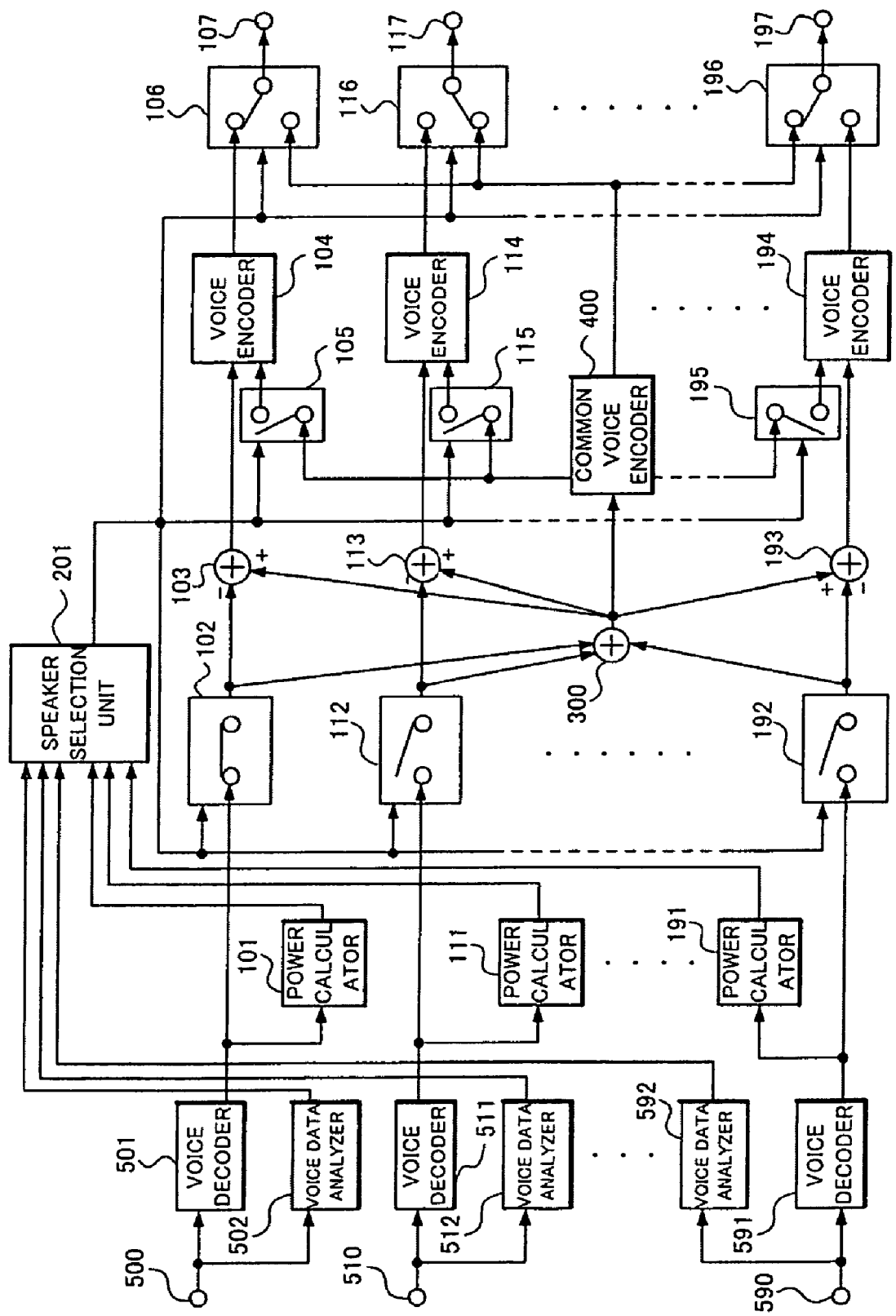
FIG. 3 is a structural view of a multipoint conference server according to the second exemplary embodiment of the invention.

Next, a second exemplary embodiment of the invention will be described referring to FIG. 3. FIG. 3 is a structural view of a multipoint conference server according to the second exemplary embodiment of the invention. The same numbers are attached to the same components as in FIG. 1 and their description is omitted.

The voice decoder 501, the voice decoder 511, and the voice decoder 591 decode the input voice data 500, the input voice data 510, and the input voice data 590 which are encoded respectively and supply the decoded voices to the power calculator 101, the power calculator 102, and the power calculator 192, and the voice signal input switch 102, the voice signal input switch 112, and the voice signal input switch 192.

The voice data analyzer 502, the voice data analyzer 512, and the voice data analyzer 592 supply the results of analyzing whether the input voice data 500, the input voice data 510, and the input voice data 590 respectively have sound or silence.

As the analysis method, an example of an AMR voice encoding method is used for description. In the AMR voice encoding method, VAD (Voice Activity Detection) is performed on the input voice to determine whether it has sound or silence and when it is determined to have silence, the information whose frame type is NO_DATA can be transmitted or the information of the background noise can be transmitted as SID (Silence Indication).

When the frame type at the head of the voice data is NO_DATA or SID, it may be determined as silence. When the VAD is not performed but every voice data is encoded as having sound, there is also a method of supplying the sound volume assumed based on a gain parameter and a spectrum parameter included in the voice data to the speaker selector 201.

The power calculator 101, the power calculator 111, and the power calculator 191 calculate the powers of decoded signals supplied from the voice decoder 501, the voice decoder 511, and the voice decoder 591 and supply their values to the speaker selector 201.

The speaker selector 201 selects the speaker who is uttering, based on the result of analysis by the voice data analyzer 502, the voice data analyzer 512, and the voice data analyzer 592, and based on the powers supplied from the power calculator 101, the power calculator 111, and the power calculator 192, supplies the result of the selection.

Specifically, there are a method for selecting the N (N<M) top-ranked speakers predetermined in order of decreasing the power supplied from the power calculator 101, the power calculator 111, and the power calculator 191 and a method for selecting the speakers having the power exceeding a predetermined threshold when the results of analysis supplied from the voice data analyzer 502, the voice data analyzer 512, the voice data analyzer 592 show that the sound or the assumed sound volume exceeds a certain threshold.

As mentioned above, according to the second exemplary embodiment of the invention, determination of sound or silence is added to the standard of selecting a speaker, thereby obtaining the selected result better than that in the case of the first exemplary embodiment.

Third Exemplary Embodiment

The third exemplary embodiment relates to a program for making a computer carry out the voice mixing method.

Referring to FIG. 1, a controller, not illustrated, controls the power calculators 101, 111, . . . , and 191, the speaker selector 200, the voice signal input switches 102, 112, . . . , and 192, the all signals adder 300, the adders 103, 113, and 193, the voice encoders 104, 114, . . . , and 194, the memory switches 105, 115, . . . , and 195, the common voice encoder 400, and the voice data switches 106, 116, . . . , and 196 which are included in the multipoint conference server.

Further, the multipoint conference server includes a storing unit, not illustrated, and the storing unit stores the program of processing procedures of the voice mixing method shown in the flow chart of FIG. 2.

The controller (or computer) reads out the above mentioned program from the storing unit and controls the above mentioned components according to the program. Since the control contents have been described, their description is omitted.

As described above, according to the third exemplary embodiment of the invention, a program for preventing an inconsistency in the memories in the differential coding at the time of switching the output of the output voice data from the common voice encoder 400 to the voice encoder 104 can be obtained, for example, with respect to the speaker 1.

The other exemplary embodiments will be described below.

Since the bandwidth is narrow in a cellular phone, it is necessary to compress the voices efficiently by using the differential coding technique. When the cellular phones are used to comprise a multipoint conference system, since the ability of a processor of each the cellular phone is limited, mixing by using the cellular phones is not realistic but a multipoint conference server is necessary in addition to the cellular phones. The exemplary embodiment of the invention is useful in this case.

As the multipoint conference system, the following patterns are considered. A first pattern is that there is one person in every conference room. A second pattern is that there are a plurality of persons in a plurality of conference rooms (further, a pattern in which there are a plurality of pairs of microphone and speaker in each conference room and a pattern in which there is one pair of microphone and speaker in every conference room). The exemplary embodiment of the invention is useful in this case.

According to exemplary embodiments of the invention, since an inconsistency does not occur in the memory contents in the encoding, it is possible to prevent the abnormal sound from occurring in the decoded voice when switching the encoder according to a change of a speaker.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A voice mixing method for mixing a plurality of voice information in a multipoint conference server, including:

a first step of selecting voice information from a plurality of voice information by a selector;

a second step of adding up all the selected voice information by an all signals adder;

a third step of obtaining a voice information by adding up the voice information other than one voice information, of said selected voice information by an adder;

a fourth step of encoding said voice information obtained in said second step, by a first encoder;

a fifth step of encoding said voice information obtained in said third step, by a second encoder; and a sixth step of copying said encoded information obtained in said fourth step into said encoded information in said fifth step, by a switch.

2. The voice mixing method according to claim 1, wherein in said sixth step, the encoded information stored in a memory of said first encoder which performs the coding of said fourth step is copied into said second encoder which performs the coding of said fifth step.

3. The voice mixing method according to claim 1, further including a seventh step of switching and supplying said encoded information obtained in said fourth step or said encoded information obtained in said fifth step according to the selected result in said first step, by an output switch.

4. The voice mixing method according to claim 1, wherein input encoded voice information is decoded by a decoder and the decoded voice information is used as the voice information in said first step.

5. The voice mixing method according to claim 1, wherein in said first step, said selector selects voice information according to power of a voice signal of said voice information.

6. The voice mixing method according to claim 1, wherein in said first step, said selector selects voice information according to whether the voice data of said voice information has sound or silence.

7. The voice mixing method according to claim 1, wherein in said third step, said adder obtains the voice information obtained by totaling the voice information other than one voice information, of said selected voice information, is obtained by subtracting said selected voice information from said added voice information one by one.

8. The voice mixing method according to claim 1, wherein said voice information is encoded data of a voice signal, in said first step, said selector analyzes a plurality of said encoded data, selects encoded data for mixing, and decodes said selected encoded data and generating a decoded voice signal.

9. The voice mixing method according to claim 1, wherein said voice information is encoded data of a voice signal, in said first step, said selector analyzes said encoded data and decoded voice signals obtained by decoding said encoded data, and selecting selects the decoded voice signals for mixing.

10. The voice mixing method according to claim 8, wherein in said second step, generating a voice signal totaling all said decoded voice signals, in said third step, generating a voice signal totaling the decoded voice signals other than a decoded voice signal, of said selected decoded voice signals, in said fourth step, differential-coding said voice signals generated by said second step in said first encoder, in said fifth step, differential-coding said voice signals generated by said third step in said second encoder, in said sixth step, making memory contents indicating a state of the second encoder of said fifth step equal to memory contents indicating a state of said first encoder of said fourth step when a selected result of said decoded voice signals for mixing is changed.

11. The voice mixing method according to claim 1, including in said multipoint conference server, a step for adjusting the sound volume of the mixed voices so that a volume difference between the voice signals is less than a predetermined volume.

12. The voice mixing method according to claim 1, including in said multipoint conference server, a step for adjusting the sound volume of the mixed voices to be equal to the largest volume of the voice in the voice signals for mixing or to be at a predetermined level.

13. A multipoint conference server which mixes a plurality of voice information, comprising:

a selector that selects voice information from said plurality of the voice information;

an all signals adder that adds up all the voice information selected by said selector;

an adder that obtains voice information by adding up the voice information other than one voice information, of said selected voice information;

a first encoder that encodes the voice information added by said all signals adder;

a second encoder that encodes the voice information added by said adder; and a switch that copies said encoded information obtained by said first encoder into said second encoder.

14. The multipoint conference server according to claim 13, wherein said switch copies the encoded information stored in a memory of said first encoder into said second encoder, according to the selected result of said selector.

15. The multipoint conference server according to claim 13, further comprising an output switch that switches and supplies the encoded information obtained by said first encoder or the encoded information obtained by said second encoder according to the selected result by said selector.

16. The multipoint conference server according to claim 13, comprising a decoder that decodes a plurality of input encoded voice information, wherein said selector selects the voice information from the plurality of the voice information decoded by said decoder.

17. The multipoint conference server according to claim 13, wherein said selector selects the voice information according to power of the voice signal of said voice information.

18. The multipoint conference server according to claim 13, wherein said selector selects the voice information according to whether the voice data of said voice information has sound or silence.

19. The multipoint conference server according to claim 13, wherein said adder obtains voice information totaling the voice information other than one voice information, of said selected voice information, by subtracting said selected voice information from the voice information added up by said all signals adder one by one.

* * * * *